United States Patent [19]
Wakai

[11] Patent Number: 5,120,172
[45] Date of Patent: Jun. 9, 1992

[54] TAPPING SCREW
[75] Inventor: Takao Wakai, Higashi, Japan
[73] Assignee: Wakai & Co., Ltd., Osaka, Japan
[21] Appl. No.: 750,488
[22] Filed: Aug. 27, 1991
[30] Foreign Application Priority Data
Apr. 15, 1991 [JP] Japan ................ 3-25013[U]
Jun. 10, 1991 [JP] Japan ................ 3-43094[U]
[51] Int. Cl.$^5$ ............................ F16B 25/00
[52] U.S. Cl. ........................ 411/387; 411/418
[58] Field of Search .......... 411/386, 387, 418, 426
[56] References Cited
U.S. PATENT DOCUMENTS
3,507,183 4/1970 Thurston ................ 411/387
3,578,762 5/1971 Siebol et al. ............ 411/387
3,937,120 2/1976 Munse ................... 411/387
4,978,350 12/1990 Wagenknecht ........... 411/387

Primary Examiner—Neill R. Wilson
Attorney, Agent, or Firm—Wenderoth, Lind & Ponack

[57] ABSTRACT

A tapping screw has a threaded shaft and a stepped drill bit portion including two or more drill portions having different diameters gradually decreasing toward the tip of the screw. The small-diameter drill portion has a larger drill angle than the large-diameter drill portion. The former firstly forms a starting hole and the latter expands it. Thus, less force is required to rotate the screw than a conventional tapping screw. Recesses are provided in the drill bit portion and have respective sides defined by cutting edges extending across only the portion of the thread closest to the tip of the tapping screw.

7 Claims, 3 Drawing Sheets

TAPPING SCREW

BACKGROUND OF THE INVENTION

This invention relates to a tapping screw, and more specifically a tapping screw for use e.g. in securing an outer wall to a light gage steel plate of a steel structure.

A conventional tapping screw used for such a purpose has a threaded shaft provided with a drill bit portion having substantially the same outer diameter as that of the shank of the threaded shaft. By thrusting the tapping screw, the drill bit portion will penetrate through the outer wall and drill a starting hole in the light gage steel plate. The threaded shaft is then threaded into the starting hole while forming threads in the plate until the outer wall is clamped to the steel plate tightly by the head of the screw.

The resistance encountered when drilling a starting hole is proportional to the diameter of the drill bit portion. Thus, the larger the shaft diameter, the larger the thrust needed for making threads. In a conventional tapping screw, the shank of a threaded shaft and the drill bit portion have substantially the same outer diameters. Thus, the drill portion has a rather large diameter. If the tapping screw has a large diameter, e.g. 6 mm, then a large thrust has to be exerted on the screw for making threads. This worsens the working efficiency.

Further, forming threads with tapping screws is frequently done at a high place. Exerting a large thrust at a high place involves great danger. Also, it is difficult for a worker to exert such a large thrust over his head. Thus, the clamping operation can be difficult.

SUMMARY OF THE INVENTION

It is an object of this invention to provide a tapping screw which will offer low resistance when drilling a starting hole, which can be threaded into a steel plate with a small thrust even if the shank diameter is large, and with which the clamping of construction material can be carried out efficiently at any place.

In accordance with the present invention, there is provided a tapping screw comprising a threaded shaft and a drill bit portion having at least two coaxial drill portions having different diameters gradually decreasing toward the tip of the tapping screw.

When threading the screw into a light gage steel plate, the small-diameter drill portion at the tip drills a small-diameter starting hole. Then the diameter of the starting hole is enlarged, by the large-diameter drill portion, to the diameter of the shank of the threaded shaft. The threaded shaft is then thrust into the starting hole thus formed so as to form threads in the steel plate.

In forming the starting hole, since the tip of the drill bit portion has a small diameter, resistance is low. Thus, the screw can bite into the steel plate effectively. The large-diameter drill portion is thrust into the small-diameter hole while chipping off the surrounding wall. Thus, no large thrust is needed in forming the starting hole. This improves the efficiency of the clamping operation.

According to this invention, there are provided a large-diameter drill portion at the end of a threaded shaft, and a small-diameter drill portion extending from the end of the large-diameter drill portion. These drill portions have different drill angles from each other. Thus, a starting hole can be drilled in two steps, so that even a large-diameter screw can be threaded with a small thrust. This ensures a smooth clamping operation even at a high place.

Also, since the threading operation can be carried out in a short time, the working efficiency is improved.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

The embodiments of this invention will now be described with reference to the accompanying drawings.

Figure 1:
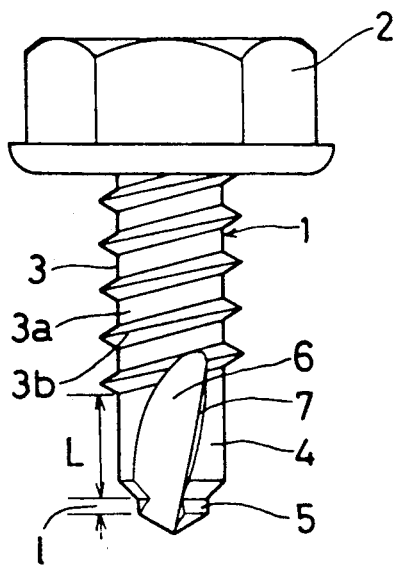
FIG. 1 is a front view of the first embodiment of this invention.
Figure 2:
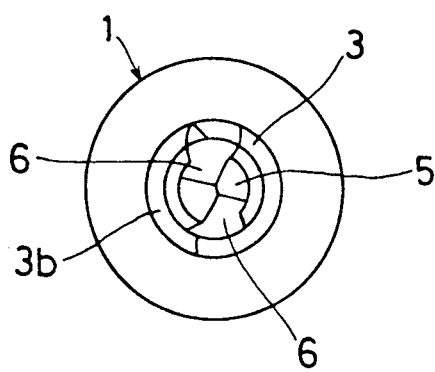
FIG. 2 is a bottom plan view of the same.
Figure 3:
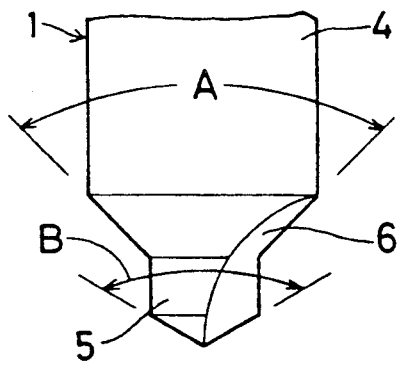
FIG. 3 is an enlarged view of the drill bit portion.

As shown in FIGS. 1-3, the tapping screw 1 has a threaded shaft 3, a head 2, a large-diameter drill portion 4 formed at the end of the threaded shaft 3, and a small-diameter drill tip portion 5 extending from the end of the large-diameter drill portion 4. The large-diameter drill portion 4 has a drill angle A which differs from the drill angle B of the small-diameter drill tip portion 5 (FIG. 3).

The threaded shaft 3 comprises a cylindrical shank 3a having a circular cross section, and a thread formed of a plurality of thread portions 3b each extending once around the outer periphery of the shank 3a. Its diameter and axial length may be determined according to the conditions of an outer wall 12 to be secured to a light gage steel plate 11. The head 2 is shown to be a flanged hexagonal head. But it may be circular or frusto-conical, and may have a groove for receiving a driver.

Figure 4:
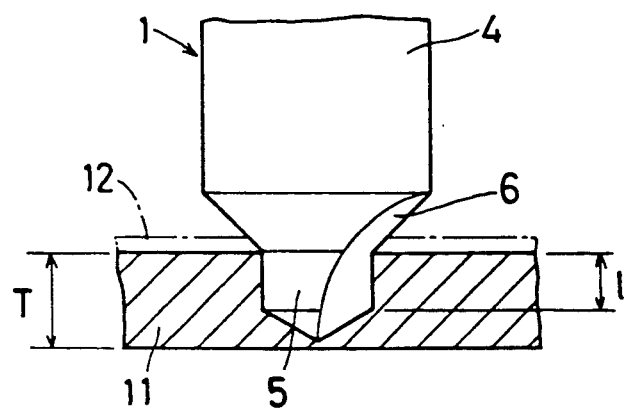
FIG. 4 is a similar view illustrating the initial stage of the step of forming a starting hole with the drill bit portion.
Figure 5:
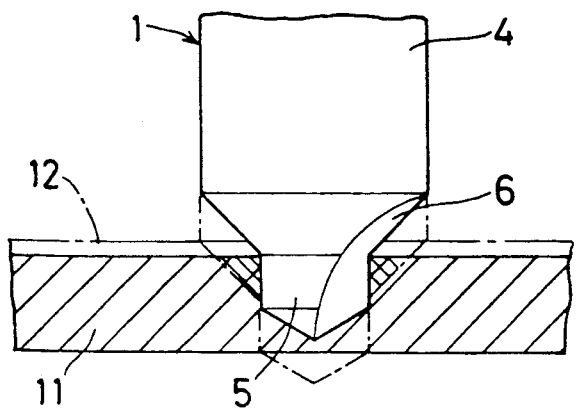
FIG. 5 is a similar view showing a starting hole being formed by the large-diameter drill portion.

The large-diameter drill portion 4 is an integral part of the cylindrical shank 3a of the threaded shaft 3 so as to be concentrical with the cylindrical shank 3a and have substantially the same outer diameter as the cylindrical shank 3a. As shown in FIG. 4, its length L is e.g. larger than the thickness T of the light gage steel plate 11.

The small-diameter drill tip portion 5 extends from an end of the large-diameter drill portion 4 so as to be integral with and concentric to the large-diameter drill portion. A cylindrical part thereof has a length l of not more than 2.3 mm in view of the thickness T of the light gage steel plate as will be hereinafter described. Its diameter may be determined freely according to the diameter of the large-diameter drill portion 4.

The drill tip portion 5 and the large-diameter drill portion 4 are provided with recesses 6 in the outer periphery thereof at opposite sides with respect to the axis of the screw, each recess 6 extended continuously from the drill tip portion 5 into the large-diameter drill portion 4. The edge of the screw defining the rear side of each recess 6 with respect to the screwing direction of the tapping screw 1 is a cutting edge 7. This cutting edge 7, and hence the recess 6, extends across the thread only at the one threaded portion closest to the tip end of the tapping screw.

The drill angle B of the drill tip 5 portion should be 120±5 degrees, within which range the drill tip portion 5 can bite into the light gage steel plate 11 most effectively. The drill angle A of the large-diameter drill portion 4 has to be smaller than the drill angle B of the drill tip portion 5 and should preferably be smaller than 90 degrees as will be described later.

In operation, the drill tip portion 5 of the tapping screw is thrust against the outer wall 12 held in contact with the light gage shape steel plate 11 and the tapping screw 1 is rotated. The drill tip portion 5 penetrates through the outer wall 12 and bites into the light gage shape steel plate 11, drilling a small-diameter starting hole. Then the large-diameter drill portion 4 will chip off the portion of wall 12 surrounding the small-diameter starting hole, thus forming a large-diameter starting hole.

Since the resistance encountered when forming a starting hole with the tapping screw 1 is proportional to the diameter of the portion of the drill in contact therewith and since the drill tip portion 5 has a small diameter, the resistance at the initial stage of drilling can be kept small. Also, the large-diameter drill portion 4 serves merely to chip off the portion of wall 12 surrounding the small-diameter starting hole, so that the resistance at this stage of drilling is small, too. As a result, the starting hole can be formed with a small thrust and even a large-diameter screw can be threaded smoothly.

Figure 6:
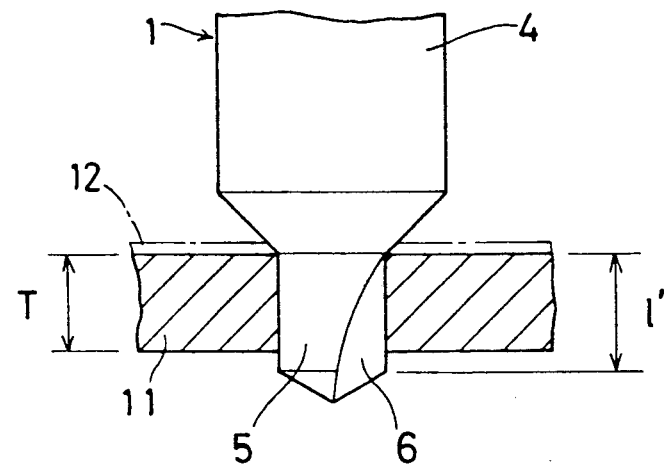
FIG. 6 is a similar view illustrating how a starting hole is formed when the drill portion at the tip is long.

In drilling a small-diameter starting hole with the small-diameter drill tip portion 5, if its length l' is larger than the thickness T of the light gage steel plate 11 as shown in FIG. 6, the large-diameter drill portion 4 would collide with the light gage steel plate 11 only after the drill tip portion 5 has completely penetrated the light gage steel plate 11.

If, as described above, the drill tip portion 5 passes through the steel plate 11 before the large-diameter drill portion 4 comes into contact with it, the large-diameter drill portion 4 will collide with and bite hard into the steel plate 11. By this collision, an operator may hurt his wrist or the tapping screw may be broken at the boundary between the drill portions 4 and 5.

An ordinary light gage steel plate 11 has a thickness T of 2.3 mm. Thus, by setting the length l of the drill tip portion 5 to not more than 2.3 mm, the steel plate 11 will be drilled by the large-diameter drill portion 4 before the drill tip portion 5 passes through the steel plate 11. This allows the initial drilling of the plate 11, with the large-diameter drill tip portion 5, to be carried out smoothly and thus can prevent trouble due to shock.

Figure 7:
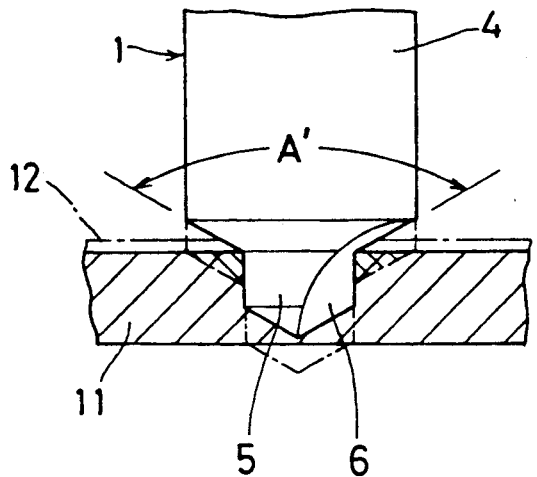
FIG. 7 is a similar view illustrating how a starting hole is formed when the large-diameter drill portion has a large drill angle.

In drilling a starting hole with the drill tip portion 5 and the large-diameter drill portion 4, if the angle A' of the large-diameter drill portion 4 is set at 120 degrees as shown in FIG. 7, it will bite too deeply into the light gage steel plate 11, thus increasing the area which it has to chip off until the drill tip portion 5 passes therethrough. This will increase the resistance on the tapping screw and thus require a larger thrust to overcome the resistance.

In contrast, by setting the drill angle A of the large-diameter drill portion 4 at 90 degrees or less, it will not bite so deeply into the light gage steel plate 11 and will drill a small-diameter starting hole at an angle of about 45 degrees. Thus, the resistance to the screw is kept small and a starting hole can be drilled smoothly in the steel plate 11 with the drill tip portion 5 and the large-diameter drill portion 4 without the need for applying a large thrust.

When the drill tip portion 5 and the large-diameter drill portion 4 have passed through the light gage steel plate 11, the threaded shaft 3 will extend into the starting hole, forming threads in the wall 12 and plate 11 within the starting hole. Then the outer wall 12 is pressed and set in position by the head 2.

Figure 8:
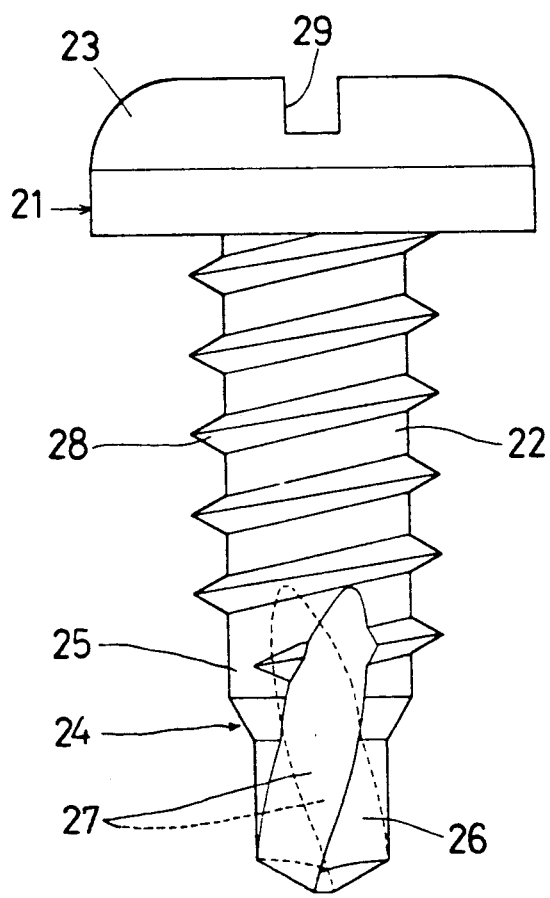
FIG. 8 is a front view of the second embodiment.
Figure 9:
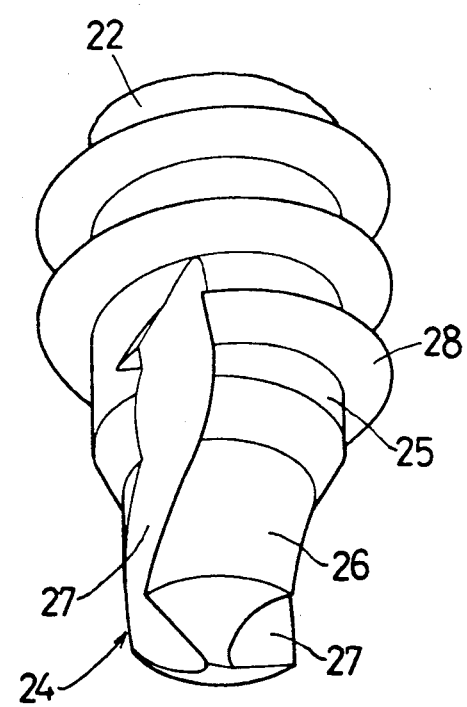
FIG. 9 is a perspective view of the drill bit portion of the same.
Figure 10:
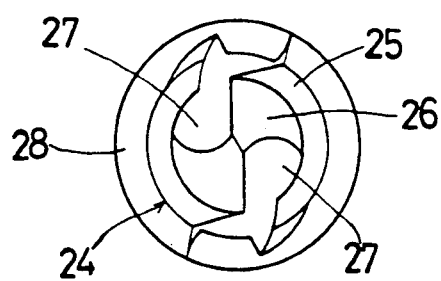
FIG. 10 is a bottom plan view of the drill bit portion.

FIGS. 8-10 show the second embodiment. As shown in FIG. 8, the tapping screw 21 of this embodiment has a threaded shaft 22, a head 23 provided at one end of the shaft 22 and a drill bit portion 24 provided at the outer end thereof.

As shown in FIGS. 8-10, the drill bit portion 24 is stepped so that its diameter decreases toward the tip of the screw.

More specifically, the drill bit portion 24 comprises a large-diameter drill portion 25 integrally provided at the end of the threaded shaft 22 and having substantially the same diameter as the shank of the threaded shaft, and a small-diameter drill tip portion 26 integrally and concentrically extending from the end of the large-diameter drill portion 25. The small-diameter drill tip portion 26 has a conical pointed end. Gullets 27 are provided in the drill bit portion 24 at both sides thereof so as to extend from the small-diameter drill tip portion 26 into the large-diameter drill portion 25.

In the illustrated embodiment, the large-diameter drill tip portion 25 is short and the lowermost portion of thread 28 on the screw shaft 22 is divided by end portions of the gullets 27. But the large-diameter drill portion 25 may be so long that the gullets 27 terminate short of the thread 28.

The difference in diameter between the large-diameter drill portion 25 and the small-diameter drill tip portion 26 is not limited, but preferably the diameter of the small-diameter drill tip portion 26 should be 4-4.5 mm if the diameter of the large-diameter drill portion 25 is 6 mm.

The head 23 is shown to be provided with a groove 29 for receiving a driver. But it may be a hexagonal head. The drill portion 24 may comprise three or more drill portions arranged in a steplike manner.

The tapping screw of this embodiment is used for securing construction material or any other article to a light gage steel plate. When tapping, the drill bit portion 24 is thrust toward the light gage steel plate. When the small-diameter drill tip portion 26 has passed therethrough, the large-diameter drill portion 25 begins drilling a through-hole in the light gage steel plate. The screw shaft 22 is forced into the through hole, forming threads in the steel plate.

In drilling such a hole with the tapping screw, the thrust force is distributed because the drill bit portion 24 has a stepped structure. This will be discussed in more detail below.

Suppose that 100 units of power are needed to drill a through-hole in a light gage steel plate with a drill bit having a diameter of 6 mm but that an operator can produce only 70 units of power. It would thus be impossible to drill a through-hole in the steel plate. The drill may idle or its bit may seize. But a drill bit with a diameter of 4 mm can drill a through-hole with only 44 units of power applied thereto. Once a through-hole is formed with this drill bit having a diameter of 6 mm can be thrust therethrough by applying 54 units of power.

Even an operator who cannot drill a through-hole 6 mm in diameter in a light gage steel plate during one operation can secure construction materials and other articles by using first a small-diameter drill bit and then drill bits having larger diameters. But this increases the number of steps and thus the working time. The drill portion 24 of the tapping screw 21 according to this invention has a stepped structure wherein the diameter decreases in steps toward the tip. The small-diameter drill tip is first thrust into the light gage steel plate. After the small-diameter drill tip 26 has passed therethrough, the large-diameter drill portion 25 drills a through-hole. Thus, the tapping screw makes it possible to secure construction material or any other material to the steel plate during one operation.

I claim:

1. A tapping screw comprising: a threaded shaft including a shank and a thread having a plurality of contiguous thread portions each extending once around the shank, and a stepped drill bit portion including at least two coaxial drill portions having different diameters, the diameter of said stepped drill bit portion decreasing toward a tip end of the tapping screw, the tapping screw having a plurality of recesses each extending in said drill bit portion and across the thread only at the thread portion thereof located closest to said tip end of the tapping screw whereby each of said recesses terminates short of a second one of the thread portions contiguous with said thread portion located closest to said tip end of the tapping screw, and the tapping screw having cutting edges defining respective sides of said recesses, said cutting edges also each extending across the thread only at said thread portion thereof located closest to the tip end of said tapping screw.

2. A tapping screw as claimed in claim 1, wherein said stepped drill bit portion includes a cylindrical large-diameter drill portion, and a cylindrical small-diameter drill portion extending from an end of said large-diameter drill portion, and said large-diameter drill portion is an integral part of said threaded shaft and has a cylindrical part of the same diameter as the shank of said threaded shaft.

3. A tapping screw as claimed in claim 2, wherein the cylindrical part of said large-diameter drill portion is non-threaded.

4. A tapping screw as claimed in claim 1, wherein said stepped drill bit portion includes a cylindrical large-diameter drill portion, and a cylindrical small-diameter drill portion extending from an end of said large-diameter drill portion, said end of the large-diameter drill portion having an outer surface subtending an angle which is different from that subtended by the outer surface of an end said small-diameter drill portion remote from said large-diameter drill portion.

5. A tapping screw as claimed in claim 4, wherein said small-diameter drill portion has a cylindrical part having a length of at most 2.3 mm.

6. A tapping screw as claimed in claim 4, wherein the angle subtended by the outer surface of the end of said small-diameter drill portion is 120±5 degrees, and the angle subtended by the outer surface of said end of the large-diameter drill portion is less than that subtended by the outer surface of the end of said small-diameter drill portion.

7. A tapping screw as claimed in claim 6, wherein said small-diameter drill portion has a cylindrical part having a length of at most 2.3 mm.

* * * * *